(12) United States Patent
Goto et al.

(10) Patent No.: US 11,359,909 B2
(45) Date of Patent: Jun. 14, 2022

(54) INDUCTION-TYPE ROTATION DETECTION DEVICE

(71) Applicant: AMITEQ CO., LTD., Tokyo (JP)

(72) Inventors: Daisuke Goto, Tokyo (JP); Kazuya Sakamoto, Tokyo (JP)

(73) Assignee: AMITEQ CO., LTD., Tokyo (JP)

( * ) Notice: Subject to any disclaimer, the term of this patent is extended or adjusted under 35 U.S.C. 154(b) by 168 days.

(21) Appl. No.: 16/962,049

(22) PCT Filed: Jan. 23, 2019

(86) PCT No.: PCT/JP2019/002073
§ 371 (c)(1),
(2) Date: Jul. 14, 2020

(87) PCT Pub. No.: WO2019/146637
PCT Pub. Date: Aug. 1, 2019

(65) Prior Publication Data
US 2020/0408504 A1    Dec. 31, 2020

(30) Foreign Application Priority Data

Jan. 23, 2018    (JP) .............................. JP2018-008985

(51) Int. Cl.
*G01B 7/30* (2006.01)
*B62M 6/50* (2010.01)
(Continued)

(52) U.S. Cl.
CPC .................. *G01B 7/30* (2013.01); *B62M 6/50* (2013.01); *B62M 6/55* (2013.01); *G01B 7/003* (2013.01); *G01D 5/204* (2013.01); *G01L 3/105* (2013.01)

(58) Field of Classification Search
None
See application file for complete search history.

(56) References Cited

U.S. PATENT DOCUMENTS 6,011,389 A    1/2000    Masreliez
6,236,199 B1    5/2001    Irle
(Continued)

FOREIGN PATENT DOCUMENTS

DE    102004027954 A1    12/2005
EP    0480912 A2    4/1992
(Continued)

OTHER PUBLICATIONS

International Search Report issued in Intl. Appln. No PCT/JP2019/002073 dated Apr. 23, 2019. English translation provided.
(Continued)

*Primary Examiner* — Jas A Sanghera
(74) *Attorney, Agent, or Firm* — Rossi, Kimms & McDowell LLP

(57) ABSTRACT

A magnetically responsive member is disposed on a rotating member along the circumference of the rotating member in such a manner that the magnetically responsive member rotates together with the rotating member, and the magnetically responsive member is formed in a line-shaped pattern varying cyclically in a rotational axis direction. A stator is disposed around the rotating member in a contactless manner, and the stator includes a primary coil wound around the rotating member, and a secondary coil forming a loop pattern of a plurality of cycles along the circumference of the rotating member. As the primary coil is AC-energized, an induced AC output signal corresponding to relative positions between the line-shaped pattern of the rotating member and the loop pattern of the secondary coil, which depend on a rotational position of the rotating member, is output from the secondary coil.

15 Claims, 4 Drawing Sheets

(51) Int. Cl.
   *B62M 6/55* (2010.01)
   *G01B 7/00* (2006.01)
   *G01D 5/20* (2006.01)
   *G01L 3/10* (2006.01)

(56) References Cited

U.S. PATENT DOCUMENTS

| | | |
|---|---|---|
| 2002/0035877 A1* | 3/2002 | Tokumoto ............ G01L 5/221 73/862.333 |
| 2002/0043972 A1 | 4/2002 | Irle |
| 2002/0189372 A1 | 12/2002 | Wallin |
| 2003/0080733 A1 | 5/2003 | Miyata |
| 2006/0076949 A1 | 4/2006 | Kawatoko |
| 2012/0223700 A1 | 9/2012 | Shao |
| 2014/0166384 A1 | 6/2014 | Ishida |
| 2014/0347075 A1 | 11/2014 | Goto |

FOREIGN PATENT DOCUMENTS

| | | | |
|---|---|---|---|
| EP | 1158276 A1 | 11/2001 | |
| JP | H08276887 A | 10/1996 | |
| JP | H08290794 A | 11/1996 | |
| JP | H08313295 A | 11/1996 | |
| JP | 2003121206 A | 4/2003 | |
| JP | 2003517595 A | 5/2003 | |
| JP | 2005049180 A | 2/2005 | |
| JP | 2006112815 A | 4/2006 | |
| JP | 2007269281 A | 10/2007 | |
| JP | 2010122012 A | 6/2010 | |
| JP | 2014095651 A | 5/2014 | |
| JP | 2014153294 A | 8/2014 | |
| JP | 2017206264 A | 11/2017 | |
| WO | 0144770 A1 | 6/2001 | |
| WO | 2013089206 A1 | 6/2013 | |

OTHER PUBLICATIONS

Written Opinion issued in Intl. Appln. No. PCT/JP2019/002073 dated Apr. 23, 2019.

Extended European Search Report issued in European Appln. No. 19743368.3 dated Sep. 6, 2021.

English translation of Written Opinion issued in Intl. Appln. No. PCT/JP2019/002073 dated Apr. 23, 2019, previously cited in IDS filed Jul. 14, 2020.

International Preliminary Report on Patentability issued in Intl. Appln. No. PCT/JP2019/002073 dated Aug. 6, 2020. English translation provided.

* cited by examiner

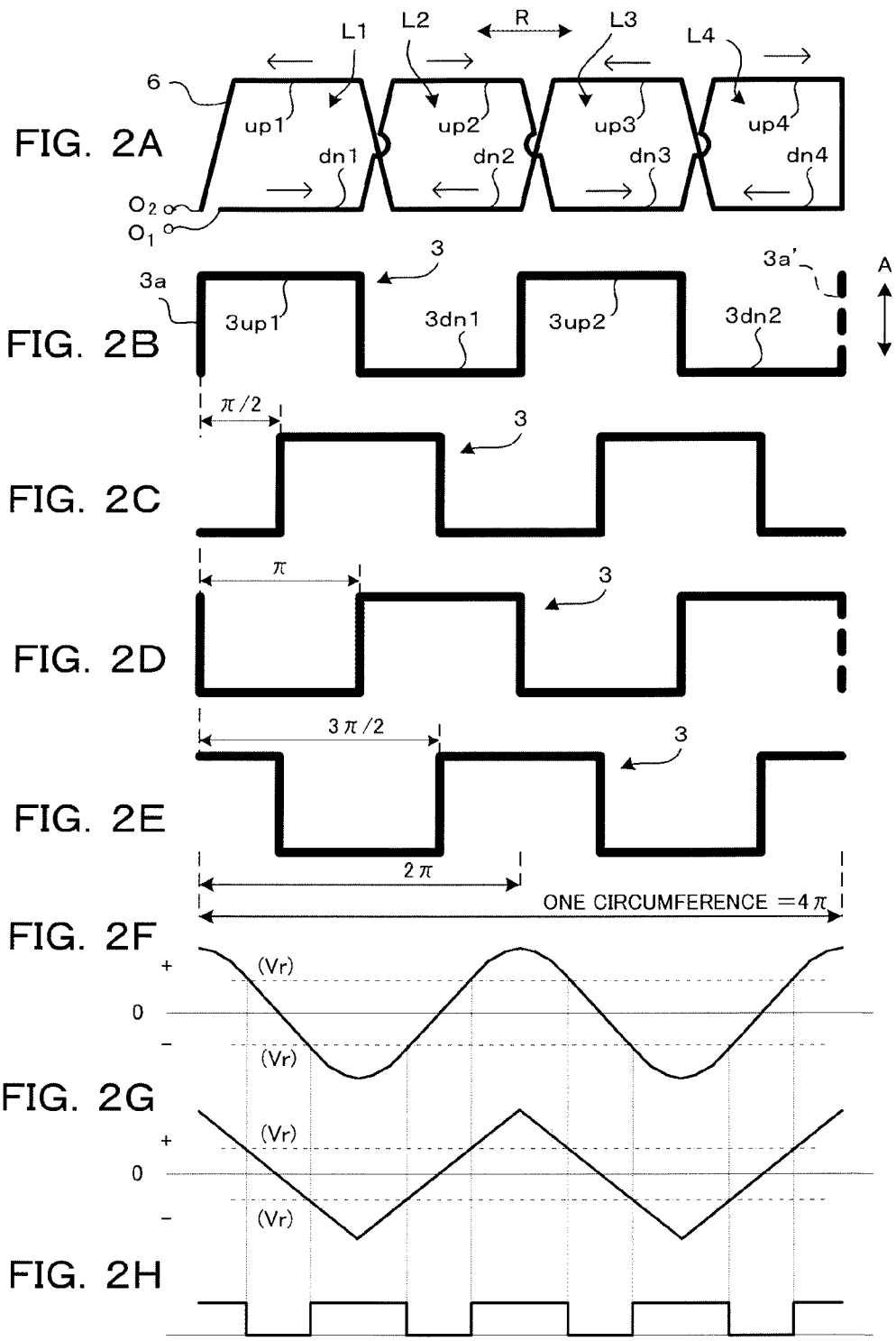

INDUCTION-TYPE ROTATION DETECTION DEVICE

TECHNICAL FIELD

The present invention relates to an induction-type rotation detection device and to a composite-type detection device that detects rotation of a rotation shaft through combination between the induction-type rotation detection device and a torque sensor for detecting torque of the rotation shaft and that is applicable to detection of rotation of a pedal crankshaft of an electric power-assisted bicycle, rotation of a steering shaft of an automotive vehicle, and the like.

BACKGROUND

There have heretofore been known various types of position detection devices that use a coil (inductance element) as a position detecting element. It has also been known to use a flat coil rather than an ordinary cylindrical coil, with a view to reducing the size of, or downsizing, a device construction. As an example, the detection device disclosed in Patent Literature 1 identified below uses, as a detecting element, a small flat coil disposed in a spiral shape on a printed circuit board. As another example, the detection devices disclosed in Patent Literatures 2 to 6 constitute an induction coil by providing a conducting wire on a flat substrate in such a manner as to form a loop pattern on the substrate. In the conventionally known position detection devices, a magnetically responsive member (magnetic coupling member) that is displaced in response to a position of an object of detection, or an object to be detected, by being magnetically coupled to the coil is formed of a metal material that consists of a ferromagnetic material, such as iron, or a good electrically conductive material, such as copper, and the magnetically responsive member is shaped in such a manner that its area or volume varies in response to the position of the object of detection.

Also, there have heretofore been known various examples in which a combination of a torque sensor and a rotation detection device is provided on a steering shaft of an automotive vehicle. Patent Literatures 7 to 9 identified below each disclose an example of such a combination. Specifically, Patent Literatures 7 and 8 each disclose that an induction-type torque sensor and an induction-type rotational position detection device are provided on the steering shaft as separate independent components. Patent Literature 9 discloses that an induction-type torque sensor is provided on the steering shaft and rotational angle detection means is provided via a transmission gear mechanism. Further, there have heretofore been known various examples in which a combination of a torque sensor and a rotation detection device is provided on a pedal crankshaft of an electric power-assisted bicycle. Patent Literatures 10 and 12 each disclose such an example.

PRIOR ART LITERATURE

Patent Literature

Patent Literature 1: Japanese Patent Application Laid-open Publication No. 2010-122012
Patent Literature 2: Japanese Patent Application Laid-open Publication No. H8-313295
Patent Literature 3: Japanese Patent Application Laid-open Publication No. 2006-112815
Patent Literature 4: Japanese Patent Application Laid-open Publication No. 2014-95651
Patent Literature 5: U.S. Pat. No. 6,236,199
Patent Literature 6: U.S. Patent Application Publication No. 2002/0043972
Patent Literature 7: Japanese Patent Application Laid-open Publication No. 2005-49180
Patent Literature 8: International Publication No. 2013/089206
Patent Literature 9: Japanese Patent Application Laid-open Publication No. 2007-269281
Patent Literature 10: Japanese Patent Application Laid-open Publication No. H8-276887
Patent Literature 11: Japanese Patent Application Laid-open Publication No. H8-290794
Patent Literature 12: Japanese Patent Application Laid-open Publication No. 2017-206264

SUMMARY

However, the coil disposed on the flat substrate as disclosed in Patent Literatures 1 to 6 is not so suited for a rotational position detection device although it is suited for a linear position detection device. Further, with the aforementioned construction where the area or volume of the magnetically responsive member varies in response to the position of the object of detection, it is difficult to reduce the size of, or downsize, a movable section.

Furthermore, with the combination of the torque sensor and the rotation detection device as disclosed in Patent Literatures 7 to 12, where the sensor and the rotation detection device are provided as separate independent components, simplifying the construction of the device is limited. Furthermore, with the construction in which the transmission gear mechanism is provided between the rotation shaft and the rotation detection device, there is a possibility of control performance being deteriorated due to wobbling resulting from gear backlashes.

In view of the foregoing prior art problems, it is one of the objects of the present invention to provide an rotation detection device having a simple and compact construction suited for promoting downsizing of the rotation detection device, and it is another object of the present invention to provide a composite-type rotation detection device which detects rotation of a rotation shaft through combination between the rotation detection device and a torque sensor.

In order to accomplish the aforementioned and other objects, the inventive rotation detection device includes: a magnetically responsive member disposed on a rotating member along the circumference of the rotating member in such a manner that the magnetically responsive member rotates together with the rotating member, the magnetically responsive member being formed in a line-shaped pattern varying cyclically in a rotational axis direction; and a stator disposed around the rotating member in a contactless manner and including a secondary coil forming a loop pattern of a plurality of cycles along the circumference of the rotating member. The secondary coil is placed in an AC magnetic field, and an induced AC output signal corresponding to relative positions between the line-shaped pattern of the magnetically responsive member and the loop pattern of the secondary coil, which depend on a rotational position of the rotating member, is output from the secondary coil.

According to the inventive rotation detection device, because the magnetically responsive member disposed on the rotating member is formed in a line-shaped pattern varying cyclically in the rotational axis direction, the magnetically responsive member is simple and compact in construction and thus is suited to promote downsizing of the rotation detection device. Further, because the secondary coil in a coil construction of the stator is constructed to form a loop pattern of a plurality of cycles along the circumference of the rotating member, the stator is suited to be provided compactly along the circumference of the rotating member. In this way, it is possible to provide the inventive rotation detection device having a simple and compact construction suited to promote downsizing of the rotation detection device.

The aforementioned rotating member may be a rotation shaft itself provided in a machine or an apparatus that is an object of rotation detection by the inventive rotation detection device. Thus, in this case, it is possible to omit or simplify a rotor component dedicated to the inventive rotation detection device and thereby even further contribute to the downsizing of the entire rotation detection device. Further, the stator may include a primary coil for generating the AC magnetic field. The primary coil may be a cylindrical coil wound around the rotating member. The stator including such a primary coil enables a necessary sufficient AC magnetic field to be generated around the rotating member with a simple and compact construction. As another example, the inventive rotation detection device may be disposed near another detection device that includes a primary coil for generating the AC magnetic field, without the stator including the primary coil, in which case the secondary coil is placed in the AC magnetic field leaking from the primary coil of the other detection device.

Further, an inventive composite-type detection device may be constructed, for example, by combining the aforementioned inventive rotation detection device with a torque sensor that detects torsional torque produced in a rotatable shaft. In such a case, the torque sensor may be constructed to include at least a primary coil for generating an AC magnetic field. In this way, the torque sensor can be caused to function as the aforementioned other detection device. In other words, the inventive composite-type detection device includes: the torque sensor that detects torsional torque produced in the rotatable shaft (rotating member) and includes at least the primary coil for generating an AC magnetic field; and the rotation detection device for detecting rotation of the rotatable shaft. In this case too, the rotation detection device includes: a magnetically responsive member disposed on a rotating member along the circumference of the rotating member in such a manner that the magnetically responsive member rotates together with the rotating member, the magnetically responsive member being formed in a line-shaped pattern varying cyclically in a rotational axis direction; and a stator disposed around the rotating member in a contactless manner and including a secondary coil forming a loop pattern of a plurality of cycles along the circumference of the rotating member. Here, the secondary coil is placed in the AC magnetic field leaking from the primary coil of the torque sensor, and an induced AC output signal corresponding to relative positions between the line-shaped pattern of the magnetically responsive member and the loop pattern of the secondary coil, which depend on a rotational position of the rotating member, is output from the secondary coil of the rotation detection device.

According to the aforementioned inventive composite-type detection device, the stator only has to include the secondary coil without the rotation detection device including a dedicated primary coil, and thus, the construction of the rotation detection device can be simplified. Further, because the magnetically responsive member disposed on the rotating member has the line-shaped pattern varying cyclically in the rotational axis direction, the magnetically responsive member is simple and compact in construction and thus is suited to promote downsizing of the rotation detection device. Further, because in the coil construction of the stator, the secondary coil is constructed to form the loop pattern of a plurality of cycles along the circumference of the rotating member, the stator is suited to be provided compactly along the circumference of the rotating member. In this way, it is possible to provide the composite-type rotation detection device having a simple and compact construction suited to promote downsizing. Furthermore, because no transmission gear mechanism has to be provided in the composite-type rotation detection device, there is no possibility of control performance being deteriorated due to wobbling resulting from gear backlashes.

BRIEF DESCRIPTION OF DRAWINGS

FIG. 2A is a diagram illustrating, in a developed manner, a loop pattern of a secondary coil, FIG. 2B is a diagram illustrating, in a developed manner, a pattern of a magnetically responsive member, FIGS. 2C to 2E are diagrams illustrating, in a developed manner, the pattern of the magnetically responsive member when the magnetically responsive member is at a rotational position different from a rotational position illustrated in FIG. 2B, FIG. 2F is a diagram illustrating an example of level variation of an induced AC output signal of the secondary coil occurring over one rotation (over one circumference), FIG. 2G is a diagram illustrating another example of level variation of an induced AC output signal of the secondary coil occurring over one rotation (over one circumference), and FIG. 2H is a diagram illustrating a rotational-speed detecting pulse waveform generated on the basis of the level variation of the induced AC output signal of the secondary coil occurring over one rotation (over one circumference);

DETAILED DESCRIPTION

Figure 1A:
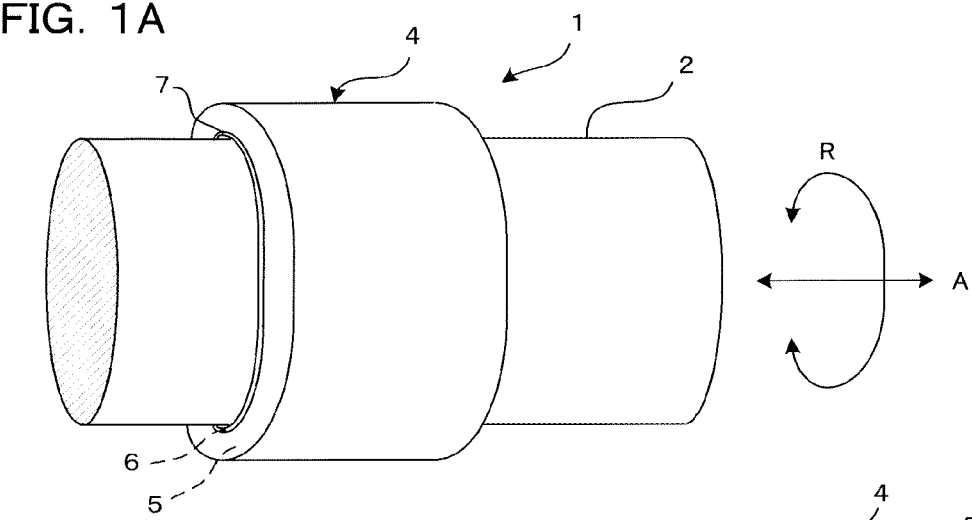
FIG. 1A is a schematic perspective view illustrating an outer appearance of a rotation detection device according to an embodiment of the present invention.
Figure 1B:
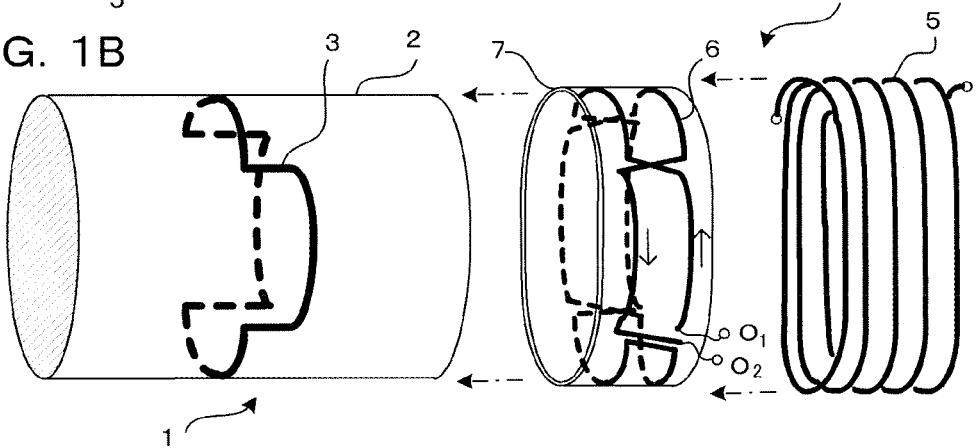
FIG. 1B is a schematic perspective view illustrating, in an unfolded or developed manner, principal sections of the inventive rotation detection device.

FIG. 1A is a schematic perspective view illustrating an outer appearance of a rotation detection device 1 according to an embodiment of the present invention, and FIG. 1B is a schematic exploded perspective view illustrating, in an unfolded or developed manner, principal sections of the rotation detection device 1. The rotation detection device 1, which is constructed to detect a rotational position of a rotating member 2, includes a magnetically responsive member 3 disposed on the rotating member 2 along the circumference of the rotating member 2 in such a manner that the magnetically responsive member 3 rotates together with the rotating member 2, and a stator 4 provided along the circumference of the rotating member 2 in a contactless manner. In FIG. 1A, arrow R denotes a rotational direction of the rotating member 2, and arrow A denotes a rotational axis direction of the rotating member 2. The magnetically responsive member 3 is formed in a line-shaped pattern varying cyclically with respect to the rotational direction R and the rotational axis direction, and this magnetically responsive member 3 is formed of a ferromagnetic material, such as iron or ferrite, or a good electrically conductive material, such as copper or aluminum. In a case where the rotating member 2 is formed of a magnetic material, such as iron, the magnetically responsive member 3 is preferably formed of a good electrically conductive material. As another example, in a case where the rotating member 2 is formed of a good electrically conductive material, such as aluminum, the magnetically responsive member 3 is preferably formed of a magnetic material. The pattern of the magnetically responsive member 3 may be formed directly on the circumferential surface of the rotating member 2 by use of a suitable processing technique, such as plating, printing or baking. As another example, the pattern of the magnetically responsive member 3 may be formed on a suitable film of a non-magnetically responsive material. In such a case, the pattern of the magnetically responsive member 3 can be formed on the rotating member 2 by attaching the film to the circumferential surface of the rotating member 2 with an adhesive. Note that the rotating member 2 is not a component dedicated to the rotation detection device 1, but a rotation shaft itself provided in a machine, a structure, an apparatus, or equipment, to which the rotation detection device 1 is applied (namely, the rotating member 2 is an object whose rotation is to be detected by the rotation detection device 1); namely, the rotating member 2 is the rotation shaft itself that is an object of rotation detection by the rotation detection device 1. Thus, it is possible to omit or simplify a dedicated rotor component of the rotation detection device 1 and thereby contribute to downsizing of the entire rotation detection device 1.

The stator 4 includes a primary coil 5 wound around the rotating member 2 and a secondary coil 6 forming a loop pattern of a plurality of cycles along the circumference of the rotating member 2. Typically, the secondary coil 6 can be formed by print-wiring a predetermined loop pattern of a lead (electrical conductor) on a ring-shaped, electrically insulative substrate 7 having a circumferential surface. Namely, the loop pattern of the secondary coil 6 is formed on the circumferential surface of the substrate 7 curved along the circumference of the rotating member 2. The primary coil 5 may be a cylindrical coil as well known in the art. A coil assembly of the stator 4 is constructed by the ring-shaped substrate 7, having the secondary coil 6 formed thereon, being disposed within the primary coil 5 that is a cylindrical coil. The coil assembly of the stator 4 is fitted around the rotating member 2 and fixed with the magnetically responsive member 3, disposed on the rotating member 2, inserted in the coil assembly of the stator 4. As conventionally known, an AC signal (for example, sin ωt) of a predetermined frequency is applied to an input terminal of the primary coil 5 in such a manner that an AC magnetic field is formed in the coil assembly. As the rotating member 2 rotates with the rotation detection device 1 installed at a predetermined position of the rotating member 2 as noted above, the pattern of the magnetically responsive member 3 is displaced relative to the coil assembly of the stator 4 in response to a rotational position of the rotating member 2. In response to the relative displacement of the magnetically responsive member 3, a degree of magnetic coupling between the primary coil 5 and the secondary coil 6 varies, so that an output signal corresponding to the rotational position of the rotating member 2 can be obtained from an output terminal of the secondary coil 6.

FIG. 2A is a diagram illustrating, in an unfolded or developed manner, the loop pattern of the secondary coil 6 disposed on the ring-shaped substrate 7. The secondary coil 6 forms the loop pattern of a plurality of cycles over one circumference of the ring-shaped substrate 7. More specifically, the secondary coil 6, consisting of a single lead (electrical conductor) connected between two output terminals $O_1$ and $O_2$, forms four loop areas L1, L2, L3, and L4 by the single lead running up and down (reciprocatively) along the one circumference of the ring-shaped substrate 7 while meandering in a predetermined pattern. A length (width) of each of the loop areas L1, L2, L3, and L4 in the rotational direction R is about one-fourth or one-quarter of the circumference. In the illustrated example of FIG. 2A, the loop areas L1, L2, L3, and L4 include upper lines up1, up2, up3, and up4 and lower line dn1, dn2, dn3, and dn4, respectively, and the upper lines up1, up2, up3, and up4 each connect to a respective one of the lower line dn1, dn2, dn3, and dn4 of the adjoining loop areas while the lower lines dn1, dn2, dn3, and dn4 each connect to a respective one of the upper lines up1, up2, up3, and up4 of the adjoining loop areas. Thus, in each of the loop areas L1, L2, L3, and L4, directions of currents flowing through the opposed upper and lower lead portions (namely, upper and lower lines) at a certain time are opposite to each other as denoted by arrows in the figure. Note here that the directions of the currents illustrated in the figure are the same direction as viewed from between the output terminals $O_1$ and $O_2$. Further, in the illustrated example of FIG. 2A, the secondary coil 6 forms the loop pattern that meanders in a generally rectangular shape. Thus, in each of the loop areas L1, L2, L3, and L4, the upper line up1, up2, up3, or up4 extends generally straight along the upper edge of the loop area, and similarly the lower line dn1, dn2, dn3, or dn4 extends generally straight along the lower edge of the loop area.

On the other hand, in the individual loop areas L1, L2, L3, and L4 of the secondary coil, currents induced in response to the AC magnetic field from the primary coil 5 are in the same direction between the upper lines up1, up2, up3, and up4 and the lower lines dn1, dn2, dn3, and dn4. Thus, when currents of the same amount are induced in the upper line up1 and lower line dn1 of the loop area L1, for example, these currents are canceled out, so that a sum of the induced currents in the loop area L1 becomes zero. When the amounts of the currents induced in the upper line up1 and lower line dn1 of the loop area L1 are different, on the other hand, a difference between the amounts of the induced currents occurs in the loop area L1. In this manner, differences between the induced currents in the upper lines up1, up2, up3, and up4 and the induced currents in the lower lines dn1, dn2, dn3, and dn4 occur in the individual loop areas L1, L2, L3, and L4, and a sum of such differences occurs between the output terminals $O_1$ and $O_2$ of the secondary coil 6.

FIG. 2B is a diagram illustrating, in a developed manner, the pattern of the magnetically responsive member 3 disposed on the rotating member 2 along the circumference of the rotating member 2. As an example, the line-shaped pattern of the magnetically responsive member 3 is a pattern of a rectangular wave shape varying cyclically in the rotational axis direction A in two cycles over one circumference. Two opposite end portions 3a and 3a' in the developed diagram of FIG. 2B are actually one identical portion. Namely, the two-cycle variation pattern of the magnetically responsive member 3 is connected integrally in a ring shape. Each of the cycles of the rectangular pattern of the magnetically responsive member 3 includes an upper edge portion 3up1 or 3up2 and a lower edge portion 3dn1 or 3dn2. The upper edge portions 3up1 and 3up2 and the lower edge portions 3dn1 and 3dn2 are offset from each other with respect to both the rotational direction R and the rotational axis direction A. Each of the upper edge portions 3up1 and 3up2 and the lower edge portions 3dn1 and 3dn2 has a length (width) in the rotational direction R that equals one-quarter of the circumference.

Next, a description will be given of corresponding relationship between the loop areas L1, L2, L3, and L4 of the secondary coil 6 illustrated in FIG. 2A and the pattern of the magnetically responsive member 3 illustrated in FIG. 2B. A state in which the upper edge portion 3up1 of the pattern of the magnetically responsive member 3 substantially coincides with the loop area L1, the lower edge portion 3dn1 substantially coincides with the loop area L2, the upper edge portion 3up2 substantially coincides with the loop area L3 and the lower edge portion 3dn2 substantially coincides with the loop area L4 as illustrated in FIGS. 2A and 2B will hereinafter be referred to as "same-phase state", for convenience of description. In the loop area L1, a maximum induced current flows through the upper line up1 by the upper edge portion 3up1 of the magnetically responsive member 3 overlapping the entire region of the upper line up1, while no induced current flows through the lower line dn1 because the magnetically responsive member 3 does not overlap the lower line dn1. Thus, the induced current flows through the upper line up1 without being subtracted. In the loop area L2, a maximum induced current flows through the lower line dn2 by the lower edge portion 3dn2 of the magnetically responsive member 3 overlapping the entire region of the lower line dn2, while no induced current flows through the upper line up2 because the magnetically responsive member 3 does not overlap the upper line up2. Thus, the induced current flows through the lower line dn2 without being subtracted and is added to the induced current of the upper line up1 in the same phase. The loop area L3 operates in the same manner as the loop area L1, and the loop area L4 operates in the same manner as the loop area L2. In such conditions, it can be said that the degree of magnetic coupling in each of the loop areas L1, L2, L3, and L4 presents a positive maximum value. Thus, in this case, an induced AC output signal of a maximum level is produced between the output terminals $O_1$ and $O_2$ of the secondary coil 6.

FIG. 2C is an unfolded or developed diagram illustrating a state in which the rotating member 2 has been displaced from the position of FIG. 2B by a distance that equals a one-quarter cycle of the pattern of the magnetically responsive member 3. If one cycle of the pattern of the magnetically responsive member 3 is denoted by $2\pi c$, the distance that equals a one-quarter cycle of the pattern of the magnetically responsive member 3 can be denoted by $\pi/2$. In this case, positional relationship of the pattern of the magnetically responsive member 3 illustrated in FIG. 2C relative to the loop areas L1, L2, L3, and L4 of the secondary coil 6 illustrated in FIG. 2A has been shifted from that in the same phase state by a one-quarter cycle. In this case, the degrees of magnetic coupling of the individual loop areas L1, L2, L3, and L4 present same positive and negative values and hence are canceled out, so that the level of the induced AC output signal between the output terminals $O_1$ and $O_2$ of the secondary coil 6 becomes zero.

FIG. 2D is a developed diagram illustrating a state in which the rotating member 2 has been displaced from the position of FIG. 2B by a distance that equals a one-half cycle of the pattern of the magnetically responsive member 3. The distance that equals a one-half cycle of the pattern of the magnetically responsive member 3 can be denoted by n. In this case, positional relationship of the pattern of the magnetically responsive member 3 illustrated in FIG. 2D relative to the loop areas L1, L2, L3, and L4 of the secondary coil 6 illustrated in FIG. 2A has been shifted from that in the same phase state by a one-half cycle; namely, in this case, the positional relationship of the pattern of the magnetically responsive member 3 is in a phase opposite from that in the same phase state. In this case, the degree of magnetic coupling of each of the loop areas L1, L2, L3, and L4 presents a negative maximum value. Thus, in this case, an induced AC output signal of a maximum level is generated between the output terminals $O_1$ and $O_2$ of the secondary coil 6. Note, however, that the electrical phase of the maximum-level induced AC output signal generated in the positional relationship of FIG. 2D is the opposite from the electrical phase of the maximum-level induced AC output signal generated in the positional relationship of FIG. 2B.

FIG. 2E is a developed diagram illustrating a state in which the rotating member 2 has been displaced from the position of FIG. 2B by a distance that equals a three-quarter cycle of the pattern of the magnetically responsive member 3. The distance that equals a three-quarter cycle of the pattern of the magnetically responsive member 3 can be denoted by $3\pi/2$. In this case, positional relationship of the pattern of the magnetically responsive member 3 illustrated in FIG. 2E relative to the loop areas L1, L2, L3, and L4 of the secondary coil 6 illustrated in FIG. 2A has been shifted from that in the aforementioned same phase state by a three-quarter cycle. In this case, the degrees of magnetic coupling of the individual loop areas L1, L2, L3, and L4 present same positive and negative values and hence are canceled out, so that the level of the induced AC output signal between the output terminals $O_1$ and $O_2$ of the secondary coil 6 becomes zero.

As set forth above, the level of the induced AC output signal between the output terminals $O_1$ and $O_2$ of the secondary coil 6 varies in cycles each corresponding to rotational displacement of the rotating member 2 that equals one cycle of the pattern of the magnetically responsive member 3 provided on the rotating member 2. Thus, because the level of the induced AC output signal between the output terminals $O_1$ and $O_2$ of the secondary coil 6 presents a value related to a rotational position of the rotating member 2, a rotational position and/or a rotational speed of the rotating member 2 can be detected on the basis of the induced AC output signal between the output terminals $O_1$ and $O_2$ of the secondary coil 6.

FIG. 2F illustrates an example of the level variation of the induced AC output signal between the output terminals $O_1$ and $O_2$ of the secondary coil 6 occurring in response to displacement of the rotating member 2 over one rotation (namely, over one circumference) of the rotating member 2. In other words, FIG. 2F illustrates an example in which relationship between the pattern of the magnetically responsive member 3 and the loop areas L1, L2, L3, and L4, etc. is designed in such a manner that level variation of a generally sine function characteristic (sin θ) can be obtained. In this case, because two cycles of the pattern of the magnetically responsive member 3 are disposed per rotation (per circumference) of the rotating member 2, the angular variable θ of the above-mentioned sine function characteristic (sin θ) varies through a range of 4π per rotation (per circumference) of the rotating member 2. Namely, level variation indicating in an absolute value a rotational position within a range of one-quarter rotation of the rotating member 2 occurs in the induced AC output signal between the output terminals $O_1$ and $O_2$ of the secondary coil 6. As conventionally known in the art, data indicative of a level of the sine function characteristic (sin θ) can be obtained by rectifying the induced AC output signal (for example, sin θ sin ωt) between the output terminals $O_1$ and $O_2$ of the secondary coil 6.

FIG. 2G illustrates another example of the level variation of the induced AC output signal between the output terminals $O_1$ and $O_2$ of the secondary coil 6 occurring in response to displacement of the rotating member 2 over one rotation (namely, over one circumference) of the rotating member 2. In other words, FIG. 2G illustrates an example in which relationship between the pattern of the magnetically responsive member 3 and the loop areas L1, L2, L3, and L4, etc. is designed in such a manner that level variation of a generally triangular wave function characteristic can be obtained. In this case too, because two cycles of the pattern of the magnetically responsive member 3 are disposed per rotation (per circumference) of the rotating member 2, the angular variable θ of the above-mentioned triangular wave function varies through a range of 4π per rotation (per circumference) of the rotating member 2. Namely, level variation indicating in an absolute value a rotational position within a range of one-quarter rotation of the rotating member 2 occurs in the induced AC output signal between the output terminals $O_1$ and $O_2$ of the secondary coil 6. As conventionally known in the art, data indicative of the angular variable θ of the triangular wave function, too, can be obtained by rectifying the induced AC output signal between the output terminals $O_1$ and $O_2$ of the secondary coil 6.

In FIG. 2F and FIG. 2G, a positive (+) region and a negative (−) region along the vertical axis indicate that the induced AC output signal between the output terminals $O_1$ and $O_2$ of the secondary coil 6 varies between opposite electrical phases. Namely, the electrical phase of the level of the induced AC output signal in the negative (−) region is opposite from the electrical phase of the level of the induced AC output signal in the positive (+) region. Note that the function characteristic of the level variation of the induced AC output signal between the output terminals $O_1$ and $O_2$ of the secondary coil 6 may be designed as desired without being limited to the sine function characteristic or triangular wave function characteristic as illustrated in FIG. 2F or FIG. 2G.

Figure 3A:
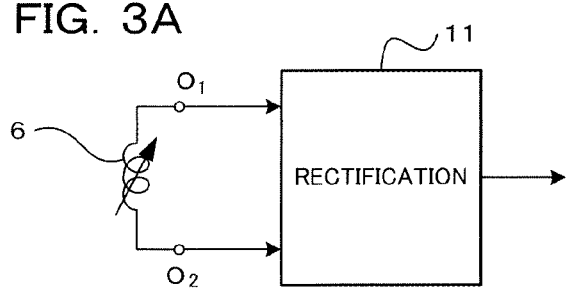
FIG. 3A is a diagram illustrating an example of a circuit for obtaining data indicative of a rotational position on the basis of the induced AC output signal of the secondary coil.

In order to obtain data indicative of a rotational position of the rotating member 2, the induced AC output signal between the output terminals $O_1$ and $O_2$ of the secondary coil 6 may be input to a rectification circuit 11 as illustrated in FIG. 3A. The rectification circuit 11 rectifies the induced AC output signal and detects an amplitude level of the induced AC output signal (outputs a DC voltage indicative of the amplitude level). The rectification circuit 11 is a circuit that obtains data indicative of a rotational position of the rotating member 2 on the basis of detecting an amplitude level of the induced AC output signal output from the secondary coil 6. In an alternative, a circuit that digitally detects an amplitude level of the induced AC output signal may be employed, instead of the aforementioned rectification circuit 11 that outputs a DC voltage indicative of an amplitude level of the induced AC output signal.

Figure 3B:
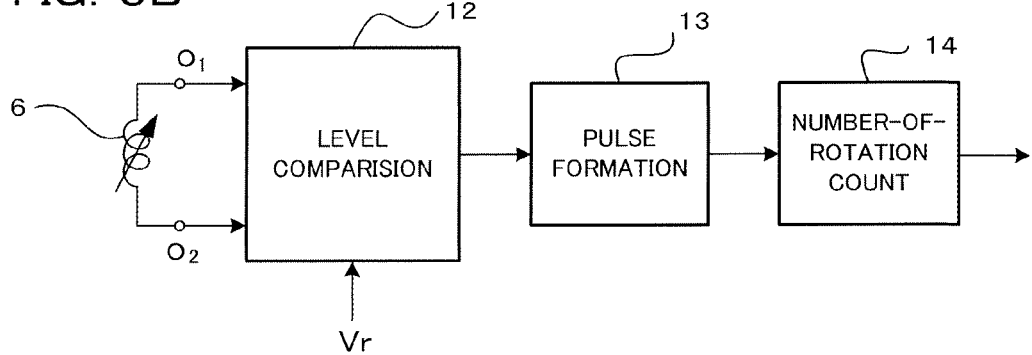
FIG. 3B is a diagram illustrating an example of a circuit for obtaining data indicative of a rotational speed on the basis of the induced AC output signal of the secondary coil.

Next, with reference to FIG. 2H and FIG. 3B, a description will be given of an example construction for measuring a rotational speed of the rotating member 2. FIG. 3B illustrates an example construction of rotational speed measuring circuitry. The induced AC output signal between the output terminals $O_1$ and $O_2$ of the secondary coil 6 is input to a level comparison circuit 12, and an output voltage is generated from the level comparison circuit 12 when the amplitude level of the induced AC output signal input to the comparison circuit 12 is greater than a predetermined reference voltage Vr. As illustrated in FIG. 2F and FIG. 2G, the aforementioned reference voltage Vr is a suitable value smaller than the maximum level of the induced AC output signal resulting from the positional relationship as illustrated in FIG. 2B and FIG. 2D. The output voltage generated from the level comparison circuit 12 is input to a pulse formation circuit 13, where the input output voltage is formed as pulse waveforms by the pulse formation circuit 13 removing AC signal components of the output voltage to thereby smooth the input output voltage. FIG. 2H illustrates the pulse waveforms output from the pulse formation circuit 13. Specifically, in the illustrated example of FIGS. 2A to 2H, four pulse waveforms are generated per rotation of the rotating member 2. The pulse waveforms output from the pulse formation circuit 13 are input to a number-of-rotation count circuit 14. The number-of-rotation count circuit 14 counts the number of the pulse waveforms output from the pulse formation circuit 13 and detects a rotational speed of the rotating member 2 on the basis of the pulse waveform count per predetermined unit time. The aforementioned level comparison circuit 12, pulse formation circuit 13, and number-of-rotation count circuit 14 together function as a circuit that generates a pulse waveform signal in accordance with amplitude levels of the induced AC output signal output from the secondary coil 6 and obtaining data indicative of a rotational speed of the rotating member 2 on the basis of the generated pulse waveform signal.

Figure 4A:
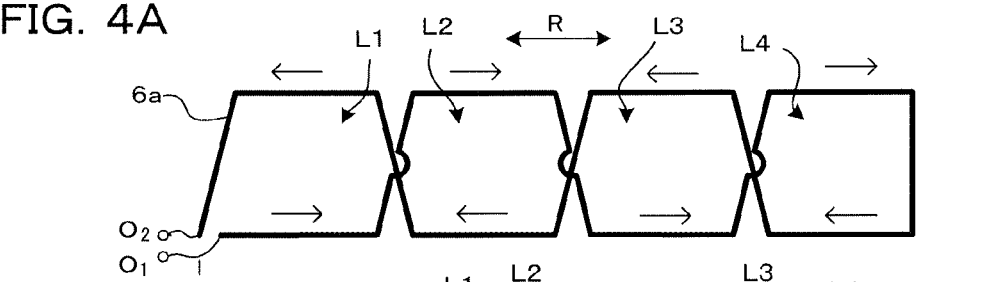
FIGS. 4A and 4B are developed diagrams of loop patterns of two secondary coils in an embodiment where the two secondary coils are disposed overlapping each other on a ring-shaped substrate.
Figure 4B:
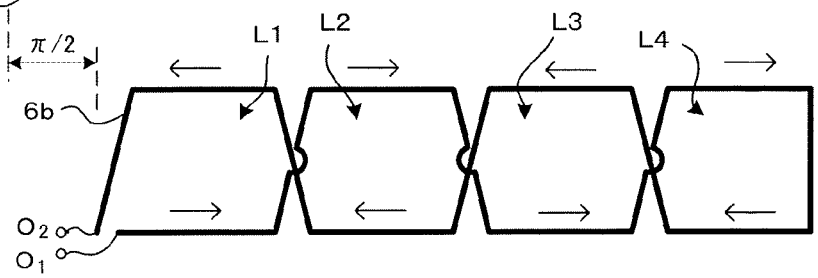

Although only one secondary coil 6 is provided on the ring-shaped substrate 7 in the above-described embodiments, the embodiments of the present invention are not so limited, and two or more secondary coils 6 may be provided on the ring-shaped substrate 7 with respective angular positions of the secondary coils 6 in the circumferential direction shifted from each other. For example, two secondary coils 6*a* and 6*b* disposed overlapping to each other on the ring-shaped substrate 7 are illustrated in developed diagrams of FIGS. 4A and 4B, in which FIG. 4A is a developed diagram of the secondary coil 6*a* and FIG. 4B is a developed diagram of the secondary coil 6*b*. Although the secondary coils 6*a* and 6*b* may each have the same pattern as the aforementioned secondary coil 6 illustrated in FIG. 2A, these secondary coils 6*a* and 6*b* are disposed with their respective angular positions in the circumferential direction shifted from each other by a distance of π/2 that equals a one-quarter cycle of the pattern of the magnetically responsive member 3. Thus, the rotation detection device can be designed in such a manner that, if a level variation characteristic of an induced AC output signal between the output terminals $O_1$ and $O_2$ of one of the secondary coils 6a (or 6b) is a sine function characteristic, a level variation characteristic of an induced AC output signal between the output terminals $O_1$ and $O_2$ of the other secondary coils 6b (or 6a) is a cosine function characteristic. Namely, with the aforementioned arrangements, it is possible to obtain, from the two secondary coils 6a and 6b, an induced AC output signal $\sin\theta \sin\omega t$ presenting a sine function amplitude characteristic relative to a rotational displacement component $\theta$ and an induced AC output signal $\cos\theta \sin\omega t$ presenting a cosine function amplitude characteristic relative to the rotational displacement component $\theta$. Because such output signals are similar to output signals of conventionally known resolver-type rotation detection devices, the inventive rotation detection device provided with the aforementioned two secondary coils 6a and 6b can be applied to uses similar to those of the conventionally known resolver-type rotation detection devices.

Figure 5:
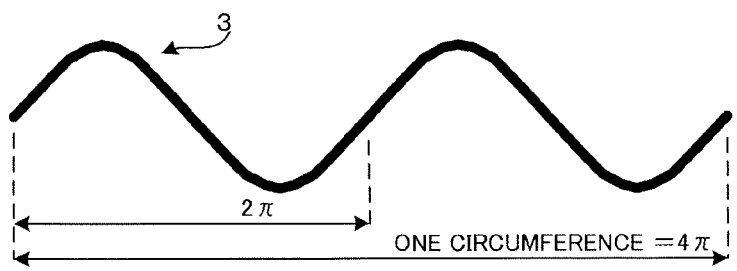
FIG. 5 is a developed diagram illustrating an example in which a line-shaped pattern of the magnetically responsive member is formed in a sine wave shape.

Further, the line-shaped pattern of the magnetically responsive member 3 is not limited to the rectangular shape as illustrated in the aforementioned figures and may be of any other desired shape, such as a sine wave shape or a triangular wave shape, as along as the pattern is of a line shape varying in a cyclic manner. Furthermore, the number of cycles per circumference may be chosen as desired. FIG. 5 is a developed diagram illustrating an example in which the line-shaped pattern of the magnetically responsive member 3 is formed in a sine wave shape.

Figure 6A:
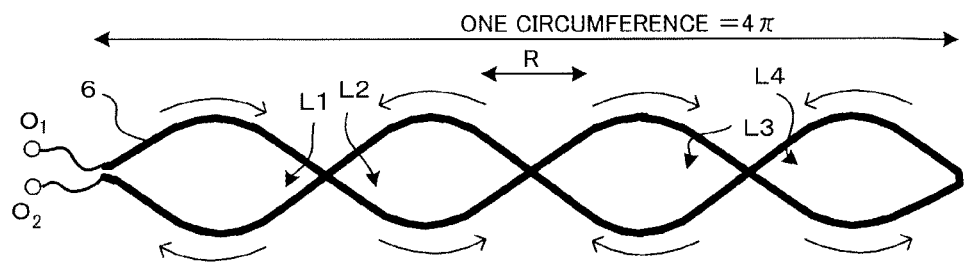
FIGS. 6A and 6B are developed diagrams illustrating another example of the loop pattern of the secondary coil.
Figure 6B:
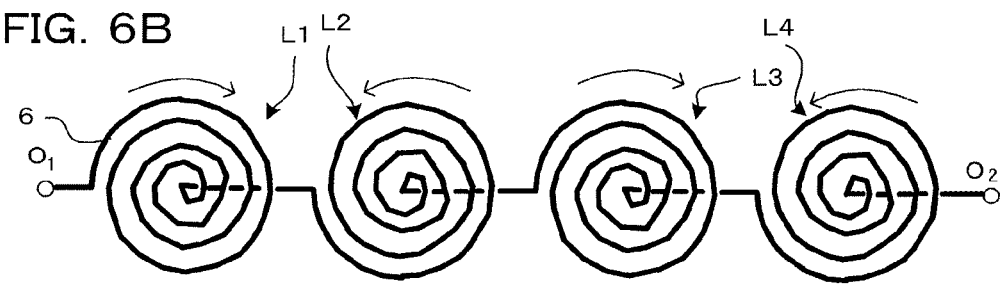

Further, the shape of the loop pattern of the secondary coils 6, 6a and 6b, too, is not limited to the rectangular shape as illustrated in the aforementioned figures and may be of any other desired shape, such as a sine wave shape or a triangular wave shape. FIG. 6A illustrates an example of the loop pattern of the secondary coil 6 formed in a sine wave shape. In the case where the loop pattern is formed in a sine wave shape as illustrated in FIG. 6A, the line-shaped pattern of the magnetically responsive member 3, too, may be formed in a sine wave shape as illustrated in FIG. 5. FIG. 6B illustrates an example in which each of the loop areas L1, L2, L3, and L4 of the secondary coil 6 is formed in a flat spiral pattern. In the example illustrated in FIG. 6B, respective spiral directions of the spiral patterns of the adjoining loop areas L1, L2, L3, and L4 are opposite from each other as denoted by arrows in the figure. Let it be assumed here that, in the case where the secondary coil 6 including the loop areas L1, L2, L3, and L4 each formed in a spiral pattern as illustrated in FIG. 6B, the line-shaped pattern of the magnetically responsive member 3 is modified as necessary to conform to the loop areas L1, L2, L3, and L4 each formed in a spiral pattern. For example, the magnetically responsive member 3 may be constructed in such a manner that only the upper edge portions 3up1 and 3up2 of the rectangular pattern of the magnetically responsive member 3 correspond to the loop areas L1, L2, L3, and L4 while the lower edge portions 3dn1 and 3dn2 do not correspond to the loop areas L1, L2, L3, and L4.

In the above-described embodiments, the inventive rotation detection device 1 has been described in relation to the case where the device 1 detects, as an absolute value, a rotational position within a range less than one rotation (one circumference) of the rotating member 2. However, the embodiments of the present invention are not so limited, and the technical ideas of the inventive rotation detection device 1 is also applicable to a case where a rotational position within a range over one rotation (one circumference) of the rotating member 2 is detected as an absolute value in accordance with a technique known in the art, as well as a case where a rotational position within a range over more than one rotation (one circumference) of the rotating member 2 is detected as an absolute value in accordance with a technique known in the art.

Figure 7:
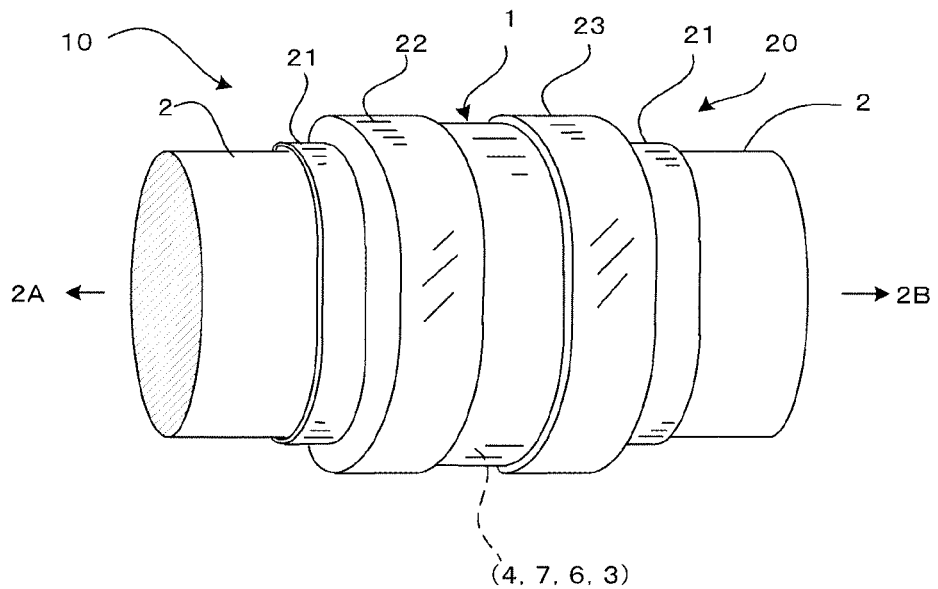
FIG. 7 is a schematic perspective view illustrating an outer appearance of an embodiment in which the inventive rotation detection device is constructed as a composite-type detection device by being combined with another sensor that has an AC magnetic field generation function.

According to another embodiment, the inventive rotation detection device 1 may be used in combination with another detection device (sensor) that has an AC magnetic field generation function, in which case the inventive rotation detection device 1 can omit the primary coil 5. FIG. 7 is a schematic perspective view illustrating an outer appearance of such an embodiment, which more particularly illustrates an embodiment where a composite-type detection device 10 is constructed by combining the aforementioned inventive rotation detection device 1 with a torque sensor 20 functioning as the other detection device (sensor). This composite-type detection device 10 is constructed to detect torque and the number of rotations of a crankshaft of pedal cranks (not shown) of an electric power-assisted bicycle. In this case, the crankshaft functions as the aforementioned rotating member 2. In FIG. 7, left and right portions of the crankshaft are connected to left and right pedal cranks (not shown), respectively, as denoted by arrows 2A and 2B, and a drive sprocket (not shown) is disposed on a predetermined portion of the crankshaft (rotating member 2). As conventionally known in the art, the drive sprocket is constructed to drive a rear wheel driving chain (not shown) that also engages with a power assisting sprocket (not shown). The power assisting sprocket is driven by an electric motor (not shown). As also conventionally known in the art, the electric power-assisted bicycles include a mechanism that not only detects pedal pressing force of a bicycle driver but also detects the number of rotations of the crankshaft and a traveling speed of the bicycle, that determines assisting power to be given by the electric motor on the basis of the detected pedal pressing force, number of rotations of the crankshaft, traveling speed, and the like, and that drives the electric motor so as to generate the determined assisting power.

In FIG. 7, the torque sensor 20, which is provided on the crankshaft (rotating member 2), functions to detect the pedal pressing force by detecting torsional torque produced in the crankshaft. The torque sensor 20 may be constructed in any desired manner as long as it includes at least a primary coil that generates an AC magnetic field. As an example, the torque sensor 20 may be constructed as a magnetostrictive ring-type torque sensor that detects, by using the magnetostrictive effect, torsion produced in the crankshaft (rotating member 2). The torque sensor 20 includes ring-shaped magnetostrictive members 21 provided in such a manner as to rotate together with the crankshaft (rotating member 2). Two rows of knurling patterns (concavities and convexities) formed on predetermined portions of the magnetostrictive members 21 along the circumference of the magnetostrictive members 21, and detecting coils 22 and 23 are provided corresponding to the individual knurling patterns. Each of the detecting coils 22 and 23 is energized by an AC signal to form an AC magnetic field and generates a detection signal corresponding to the magnetostrictive effect of the corresponding magnetostrictive member 21. As conventionally known in the art, torsion (torque) of the crankshaft (rotating member 2) is detected on the basis of the detection signals generated from these detecting coils 22 and 23.

The detecting coils 22 and 23 of the torque sensor 20 also function as the primary coil 1 provided in the inventive rotation detection device 1. Namely, the inventive rotation detection device 1 is disposed near the torque sensor 20 so as to be placed under the influence of the AC magnetic fields generated by the detecting coils 22 and 23. In the illustrated example of FIG. 7, the inventive rotation detection device 1 is disposed between the two detecting coils 22 and 23. In this case, the inventive rotation detection device 1 includes the magnetically responsive member 3 provided so as to rotate together with the rotating member 2, and the stator 4. The stator 4 has the ring-shaped substrate 7 having the secondary coil 6 disposed thereon, but the stator 4 does not have a dedicated primary coil 5. Because the stator 4 does not have a dedicated primary coil 5, the construction of the rotation detection device 1 can be simplified. Note that the magnetically responsive member 3 and the secondary coils 6 provided here are similar in construction to those provided in the above-described embodiments and thus execute rotation detection through operation similar to that of the above-described embodiments. Although the rotation detection device 1 can be used suitably as a sensor for detecting the number of rotations (rotational speed) of the pedal crank, the rotation detection device 1 can also be used for detecting a rotational position (angle) of the pedal crank.

In the case where the inventive rotation detection device 1 is used in combination with another sensor having an AC magnetic field generation function, the rotation detection device 1 can be applied to other desired uses than the detection of the number of rotations of the pedal cranks of the electric power-assisted bicycle. For example, the inventive rotation detection device 1 may be used in combination with a torque sensor provided on a steering shaft of a steering wheel of an automotive vehicle. Namely, by providing the inventive composite-type detection device 10 in relation to a steering shaft (functioning as the rotating member 2) of a steering wheel of an automotive vehicle, it is possible to effectively detect steering torque and steering angle with a simplified construction. Note that the torque sensor 20 is not limited to a magnetostrictive-type sensor as set forth above and may be one based on any detection principle as long as the torque sensor 20 is of a type including at least a primary coil for generating an AC magnetic field.

The invention claimed is:

1. A rotation detection device comprising:
a magnetically responsive member disposed on a rotating member along a circumference of the rotating member in such a manner that the magnetically responsive member rotates together with the rotating member, the magnetically responsive member being formed in a line-shaped pattern varying cyclically in a rotational axis direction; and
a stator disposed around the rotating member in a contactless manner and including a secondary coil forming a loop pattern of a plurality of cycles along the circumference of the rotating member,
wherein the secondary coil is placed in an AC magnetic field, and an induced AC output signal corresponding to relative positions between the line-shaped pattern of the magnetically responsive member and the loop pattern of the secondary coil, which depend on a rotational position of the rotating member, is output from the secondary coil.

2. The rotation detection device according to claim 1, wherein the rotating member is a rotation shaft itself provided in a machine or an apparatus that is an object of rotation detection by the rotation detection device.

3. The rotation detection device according to claim 1, wherein the loop pattern of the secondary coil is formed on a circumferential surface of a substrate curved along the circumference of the rotating member.

4. The rotation detection device according to claim 1, wherein the line-shaped pattern of the magnetically responsive member has a rectangular wave shape.

5. The rotation detection device according to claim 1, wherein the line-shaped pattern of the magnetically responsive member has a sine wave shape.

6. The rotation detection device according to claim 1, wherein the magnetically responsive member is formed directly on a circumferential surface of the rotating member by plating, printing or baking.

7. The rotation detection device according to claim 1, wherein the magnetically responsive member is formed on a film of a non-magnetically responsive material and is disposed on the rotating member by the film being attached to a circumferential surface of the rotating member.

8. The rotation detection device according to claim 1, wherein the stator includes a primary coil for generating the AC magnetic field.

9. The rotation detection device according to claim 8, wherein the primary coil comprises a cylindrical coil wound around the rotating member.

10. The rotation detection device according to claim 1, which is disposed near another detection device that includes a primary coil for generating the AC magnetic field, and
wherein the secondary coil is placed in the AC magnetic field leaking from the primary coil of the other detection device.

11. The rotation detection device according to claim 1, further comprising a circuit that obtains data indicative of a rotational position of the rotating member based on detecting an amplitude level of the induced AC output signal output from the secondary coil.

12. The rotation detection device according to claim 1, further comprising a circuit that generates a pulse waveform signal in accordance with an amplitude level of the induced AC output signal output from the secondary coil and obtains data indicative of a rotational speed of the rotating member based on the pulse waveform signal.

13. The rotation detection device according to claim 1, wherein the stator includes two secondary coils, and respective loop patterns of the two secondary coils are shifted from each other in a circumferential direction of the rotating member, and
wherein an induced AC output signal presenting a sine function amplitude characteristic relative to the rotational position of the rotating member is generated from one of the secondary coils, while an induced AC output signal presenting a cosine function amplitude characteristic relative to the rotational position of the rotating member is generated from other of the secondary coils.

14. A composite-type detection device comprising:
(1) a rotation detection device comprising:
a magnetically responsive member disposed on a rotating member along a circumference of the rotating member in such a manner that the magnetically responsive member rotates together with the rotating member, the magnetically responsive member being formed in a line-shaped pattern varying cyclically in a rotational axis direction; and
a stator disposed around the rotating member in a contactless manner and including a secondary coil forming a loop pattern of a plurality of cycles along the circumference of the rotating member, wherein the secondary coil is placed in an AC magnetic field, and an induced AC output signal corresponding to relative positions between the line-shaped pattern of the magnetically responsive member and the loop pattern of the secondary coil, which depend on a rotational position of the rotating member, is output from the secondary coil, the rotation detection device being disposed near another detection device that includes a primary coil for generating the AC magnetic field, wherein the secondary coil is placed in the AC magnetic field leaking from the primary coil of the other detection device constructed to detect rotation of a shaft functioning as the rotating member; and (2) a torque sensor that detects torsional torque produced in the shaft, the torque sensor functioning as the other detection device.

15. The composite-type detection device according to claim 14, wherein the shaft is a pedal crankshaft of an electric power-assisted bicycle or a steering shaft of an automotive vehicle.

* * * * *